April 6, 1943.      V. B. NELSON      2,315,539
FISHING ROD
Filed Aug. 2, 1940
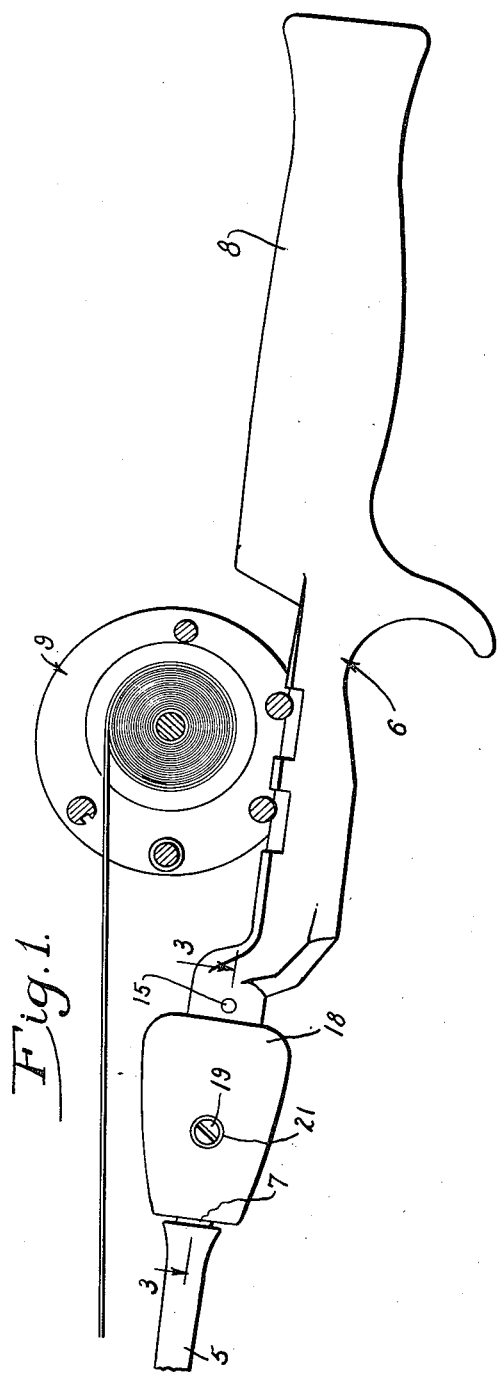
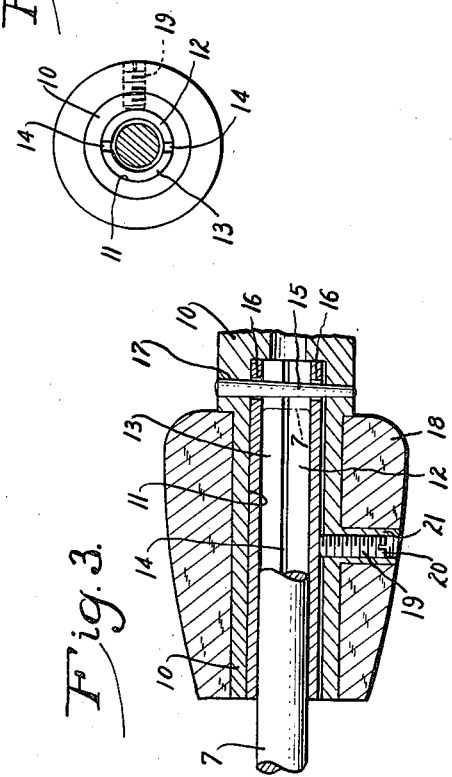
INVENTOR
*Victor B. Nelson*
BY *Parker, Carlson, Pitzner & Hubbard*
ATTORNEYS Patented Apr. 6, 1943

2,315,539

UNITED STATES PATENT OFFICE 2,315,539

FISHING ROD

Victor B. Nelson, Rockford, Ill.

Application August 2, 1940, Serial No. 349,925

4 Claims. (Cl. 43—23)

This invention relates to multiple part fishing rods and its main object is to provide novel adapter means for forming a secure connection between the upper end of a handle and the lower end of fishing rods of varying sizes.

The invention also resides in the novel construction of the adapter which makes for simplicity and ease of attachment of the rod parts together.

Other objects and advantages of the invention will become apparent from the following detailed description taken in connection with the accompanying drawing, in which Figure 1 is a fragmentary elevational view of a fishing rod embodying the present invention.

Figs. 2 and 3 are sections taken along the lines 2—2 and 3—3 of Fig. 1.

The invention is embodied for purposes of illustration in a casting rod having a flexible tapered rod proper indicated at 5 and a handle 6 telescoping with and detachably clamped at its upper end to the butt end 7 of the rod. The handle has a grip 8 and intermediate its ends is fashioned to support a reel 9.

In rods of this kind, the upper end 10 of the handle is of tubular form having an end recess or bore 11 for receiving the butt end of the rod. Herein, the recess 11 is substantially larger than the average rod butt so as to provide space for the novel adapter means by which rods of widely varying sizes may be accommodated and clamped effectively in the handle.

Generally stated, the improved adapter comprises a clamping member disposed within and extending longitudinally of the recess 11 and held against rotation but adapted to move bodily and laterally to clamp and unclamp the butt 7 by the actuation of means accessible from the outer side of the tubular handle end. In the present instance, the clamping member comprises a bar 12 of semi-circular cross section fitting within the recess 11 and against one side of the inserted rod butt 7 and coacting with a similar bar 13 on the opposite side of the recess to form a sleeve split longitudinally as indicated at 14. By employing two sleeve members, the rod end 7 inserted between them may be centered approximately within the tube 10.

To hold the member 12 against rotation within the handle recess while permitting lateral floating thereof to clamp and release the rod, the ends of the two members 12 and 13 remote from the open end of the handle are apertured as indicated at 16 to receive a tapered cross-pin 15. Opposite ends of the latter are wedged into holes 17 in the tube 10 and are exposed beyond the end of a covering or supplemental hand grip 18 provided on the upper end of the tube.

Actuation of the clamp 12 is effected in the present instance by a screw 19 threading through a hole in the side of the tube 10 and a lug 21 cast integral with the tube and terminating near the outer surface of the covering 18. The inner end of the screw bears against the outer surface of the member 12 while the head 20 is exposed from the exterior of the handle and thus accessible for application of a screw driver or other suitable tool by which the screw may be turned in and out relative to the tube 10 to tighten and release the clamp.

To attach a rod to the handle, the screw 19 is loosened allowing sufficient retraction of the clamp 12 to permit the rod butt 7 to be inserted to a position as shown in dotted outline in Fig. 3, preferably adjacent the pin 15. Then the screw is tightened forcing the member 12 laterally and inwardly against the butt. The latter is thus clamped firmly between the members 12 and 13 with a force determined by the degree of tightening of the screw. Thus clamped, the rod is held firmly in the handle which, by variable movement of the clamping member, is adapted to accommodate rod butts of widely varying diameters. To release the rod and permit of its detachment from the handle, it is simply necessary to loosen the screw 19.

The handle constructed with the adapter plates 12 and 13 mounted as above described will accommodate a reasonably wide range of rod sizes as determined by the range of movement of the plate 12. Rod butts beyond this range may be accommodated by substituting adapter plates. This may be done by first driving out the pin 15 to free the plates for removal from the handle. Plates of the proper curvature and thickness are then substituted and the pin replaced.

This application is a continuation in part of my copending application, Serial No. 230,171, filed September 16, 1938, which has eventuated in Patent No. 2,236,603, issued April 1, 1941.

I claim as my invention:

1. A fishing rod handle having a rigid tubular projection at its upper end, a two part split sleeve within said tubular projection adapted to receive the butt end of a fishing rod inserted therein, a pin extending transversely through said projection and the parts of said sleeve to hold the sleeve in said projection, and a clamping device extending laterally through said projection forwardly of said pin and acting when tightened to press the sides of said sleeve toward each other to grip the portion of a rod inserted therein.

2. A fishing rod handle having a rigid tubular projection at its upper end, a split sleeve within said tubular projection adapted to receive the butt end of a fishing rod inserted therein, means to hold the sleeve in said projection while permitting of contraction of the sleeve, and a clamping device adapted when tightened to contract said sleeve relative to said projection and grip the portion of a rod inserted therein.

3. A fishing rod handle having a rigid tubular projection recessed to receive the butt of a rod, a member disposed in the recess along one side thereof and adapted to fit against one side of a rod inserted in the recess, means to hold said member in said projection and against turning while permitting of lateral floating thereof, and a screw element threading laterally through said projection and engageable with said member to force the latter into clamping engagement with a rod butt, said screw element being accessible from the exterior of said projection for application of a turning tool thereto.

4. A fishing rod handle having a rigid tubular projection at its upper end with a recess therein opening axially, a clamping member disposed within and extending longitudinally of said recess and having an inner surface engageable with the side of a rod butt inserted in said recess, means holding said member against rotation while permitting of bodily lateral movement thereof, and means accessible from the outside of said projection and manually operable to force said member laterally against said rod end and thereby clamp the latter in said recess, said means including a screw element.

VICTOR B. NELSON.